United States Patent [19]

McDonnal

[11] Patent Number: 5,428,523
[45] Date of Patent: Jun. 27, 1995

[54] CURRENT SHARING SIGNAL COUPLING/DECOUPLING CIRCUIT FOR POWER CONVERTER SYSTEMS

[75] Inventor: John E. McDonnal, San Jose, Calif.

[73] Assignee: RO Associates, Sunnyvale, Calif.

[21] Appl. No.: 39,969

[22] Filed: Mar. 30, 1993

[51] Int. Cl.$^6$ .......................................... H02M 3/155
[52] U.S. Cl. ...................................... 363/71; 307/58; 307/82
[58] Field of Search ............... 307/58, 82, 80; 363/71, 363/72, 98, 132, 65; 323/272

[56] References Cited

U.S. PATENT DOCUMENTS

| | | | |
|---|---|---|---|
| 4,030,015 | 6/1977 | Herko et al. | 363/16 |
| 4,150,425 | 4/1979 | Nagano et al. | 363/56 |
| 4,680,689 | 7/1987 | Payne et al. | |
| 4,695,933 | 9/1987 | Nguyen et al. | 363/17 |
| 4,719,559 | 2/2988 | Sokal et al. | 363/98 |
| 4,929,882 | 5/1990 | Szepesi. | |
| 4,975,820 | 12/1990 | Szepesi | 363/21 |
| 5,036,452 | 7/1991 | Loftus. | |
| 5,122,726 | 6/1992 | Elliott et al. | 323/272 |
| 5,164,890 | 11/1992 | Nakagawa et al. | 363/65 |

OTHER PUBLICATIONS

David Maliniak, Dense DC-DC Converters Actively Share Stress, Electronic Design dated Jan. 21, 1993, pp. 39-44.

Genesis, High Density Single and Triple Output DC-DC Converters, Application Notes, Issue 1.0, Feb. 1991, pp. 10-13.

Charles E. Mullett, A User's Guide to Applying Power-Conversion Modules, Electronic Design dated Jan. 31, 1991, pp. 75-81.

*Primary Examiner*—Thomas M. Dougherty
*Assistant Examiner*—Adolf Berhane
*Attorney, Agent, or Firm*—Claude A. S. Hamrick

[57] ABSTRACT

An improved current sharing signal coupling/decoupling circuit for power converter systems, including the provision of an individual current sharing signal coupling/decoupling circuit for each module of a number of parallel connected modules, each circuit providing an interface between a module's "current sharing signal" port and a common connection bus. The signal coupling/decoupling circuits also share a common ground noted in the disclosure as "current sharing signal ground". The signal coupling/decoupling circuit includes a comparator, a bi-directional switch and a variable voltage reference. The comparator senses the difference between the voltage on the common connection bus, the "common current sharing signal," less an amount set by the variable voltage reference circuit, and the voltage on the module current sharing signal port, the "module current sharing signal". If the module current sharing signal drops below the common current sharing signal, the comparator activates the bi-directional switch, disconnecting the module current sharing signal port from the common connection bus, allowing the remaining parallel connected modules to continue normal operation, thus providing a system that is tolerant of individual module faults. If n modules are the minimum number required to meet a system's current output specification, then the use of n+1, n+2, . . . n+N modules with corresponding current coupling-/decoupling circuits will allow for continued operation of the system in the event of failure of 1, 2, . . . N modules, the system reliability increasing with the number of modules in excess of n.

18 Claims, 8 Drawing Sheets

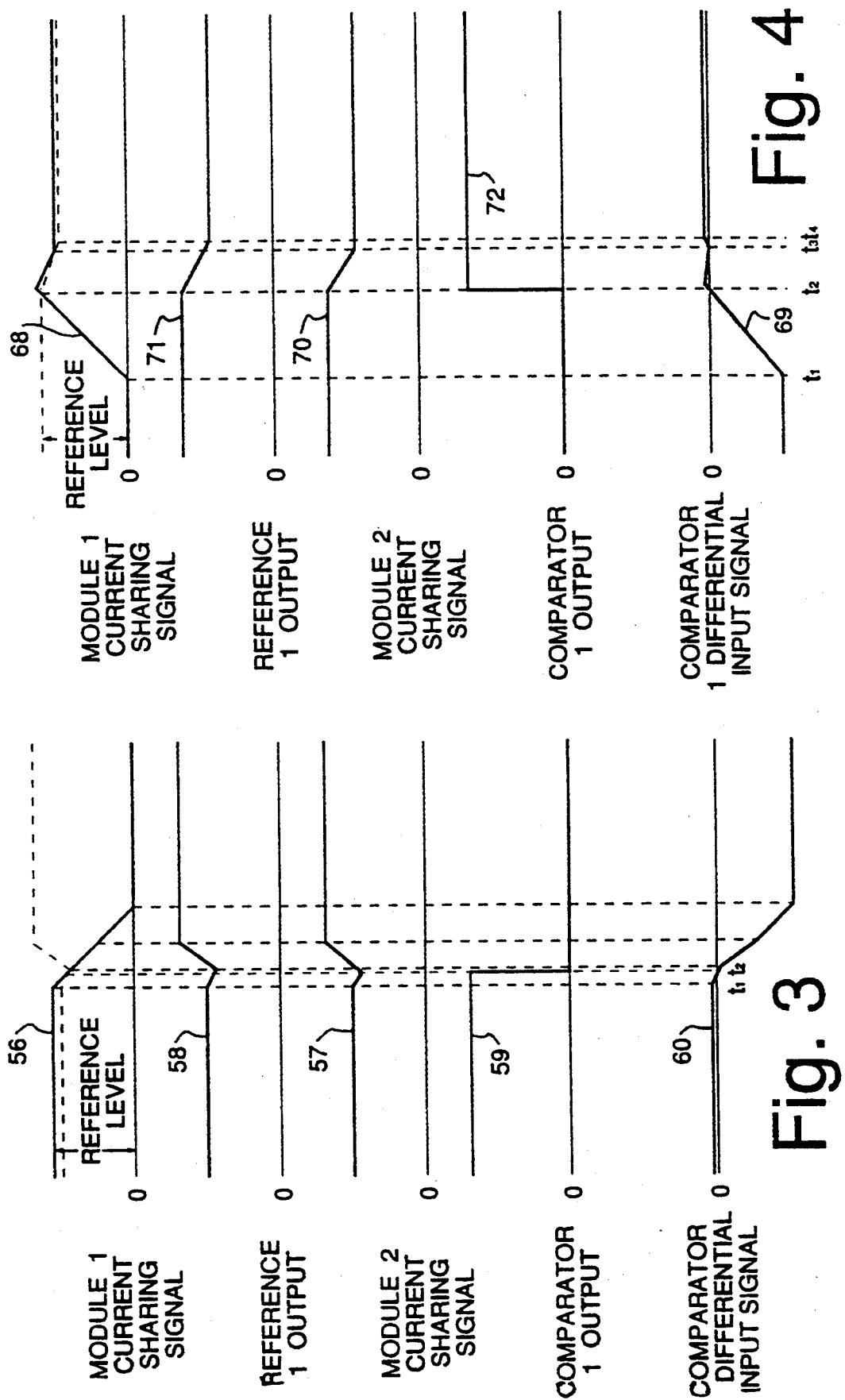

CURRENT SHARING SIGNAL COUPLING/DECOUPLING CIRCUIT FOR POWER CONVERTER SYSTEMS

BACKGROUND OF THE INVENTION

1. Field of the Invention

The present invention relates generally to modular power converters, and more particularly to improved control circuitry for allowing the interconnection and control of a plurality of modular power supplies used to drive a common load. The present invention has particular applicability to current mode controlled power supplies, and is operative to automatically disconnect failed modules from the combination, so as to allow uninterrupted operation of the system in the event that one or more individual modules should fail or be removed/replaced in the system. The present invention allows operation of a modular power system in an energy conservation mode wherein modules are automatically switched in and out of operation as required to insure that the operational modules operate at peak efficiency and thereby conserve energy.

2. Brief Description of the Prior Art

Current mode controlled power supplies, sometimes referred to as power converters, are commonly used to provide power for numerous types of electronic apparatus. Such devices typically have a current sharing terminal at which a signal is developed to provide a means of causing several modules operated in parallel to equally share the load, The usual technique for providing this function in a power supply module is to use a current mode pulse width modulator (PWM), such as a UNITRODE UC3842A as the controller for the module, and to provide the PWM error voltage as the current sharing signal. Current mode control in converters is well known and has been previously described in many publications including the UNITRODE application note U-100A, for example. Basically, the difference between an analog of the converter's output and a reference signal is amplified by an error amplifier. The output of the error amplifier, called the error voltage, is in turn compared to a voltage signal which is an analog of the converter's primary current. The comparator performing this function controls circuitry which terminates the primary current pulse when the level established by the error signal is reached. The signal is usually a low level DC voltage in the 1–6 volt range and is referenced to minus input.

With two or more modules connected in parallel, the signal reference, or ground connection, is already common to each module whether it is input or output referenced. By connecting the current mode PWM reference voltages of the modules to each other, the primary currents are forced to be equal to each other, and hence current sharing is achieved. The current sharing signal is produced by the module for comparison purposes, and has the characteristic that, if controlled or altered external to the PWM, it can adjust the module's current output. If this signal is shorted to signal ground or is held at zero potential externally, the module output will go to zero because the current mode PWM will hold the current to zero. Thus, the current sharing terminal can be used as a point to apply a logic low signal to disable the converter.

The availability of modular power supplies and power converters which can be operated in parallel with current sharing has opened up the possibility of an "n+1" approach to power system design. The number "n" is determined by taking the total system power requirement and dividing by the power to be delivered by each individual module and rounding up to the nearest whole number. This is the minimum number of paralleled modules required to provide the required power. The reliability is, however, increased by adding one more module, bringing the total number of modules to "n+1" so that in the event of failure of a single module the remaining "n" modules can continue to provide the system with the required power. Said systems are said to have "n+1" redundancy.

A problem generally common to such systems is that the signal used to produce current sharing is common to all modules and is a point by which a single failed unit can cause the shutdown of the entire system, regardless of the number of modules in parallel. The common current sharing signal is generally a signal which is proportional to the amount of current, and thus power delivered by each module. Since all paralleled modules share the common signal, a failure of one module which causes the signal to go to zero will cause the power delivered by each and every module to go to zero, thus causing the shutdown of the entire system and defeating the reliability that would otherwise be provided by using "n+1" or more modules.

Systems that are provided with redundancy for reliability are often intended to be operated on a continuous basis, such that shutdown of the system is an event that rarely, or never, occurs. Said systems are generally constructed such that power converters and other system components can be replaced without de-energizing the system. This is generally referred to as "hot-plug-in" or "hot-swapping". In such systems a failed part of the system can be removed and replaced without shutting down the system even momentarily.

Another problem common to the approach of using modular power supplies and power converters operating in parallel with current sharing is the reconnection of the current sharing signal of the module being plugged in during the "hot-plug-in" operation. This operation can cause momentary shutdown of the system because the current sharing signal of the module being plugged in is initially zero.

In a system made up of many individual modules, it is often desirable to provide a means for turning on and off individual modules, either by switching off the input voltage supplied from the input power source to an individual module, or by using logic signals, for the purpose of system testing or to conserve energy. The approach of using modular power supplies and power converters operating in parallel with current sharing presents a problem in performing the turning off of the individual module without causing shutdown of the entire system. Similarly, the turning on or off of an individual module may cause momentary shutdown of the entire system. Many prior art circuits intended to be used for providing current sharing of modules have the disadvantage that not all of the modules are configured identically, but instead one is configured as a "master" and the others are configured as "slaves". In such an arrangement of modules, the master provides a control signal to each slave. This type of system is generally prone to total shutdown in the event of the failure of the master. Such circuits are not suitable for use in "n+1" redundancy designs.

Another type of circuit uses a small resistor in series with the output of each module to generate a small voltage which can be compared to that of another module. The difference is usually amplified, and a signal is generated to act upon the module's feedback amplifier or sense circuit in such a way as to force current sharing. This type of circuit has the obvious disadvantage of being wasteful of energy when the output current of the system is high, which is the usual case when many modules are paralleled. For example, if the signal generated by the current sense resistor is 100 mV and the power system output is 3.3 V, then three percent of the output power must be wasted to provide the current sense signal. Sometimes such circuits also have a limit to the number of modules that can be coupled together in a sharing arrangement.

One prior art circuit provides circuitry for each module to which the module current sharing signal is connected. The circuit then amplifies any differences in the current sharing signals and generates a signal to drive the module sense circuit. The module output voltage is driven up if its current sharing signal drops below that of the others. The disadvantages of this circuit are (1) high parts count; (2) input to output isolation must be provided; and (3) a separate amplifier that acts on the sense amplifier to alter the response to the module must be provided.

The input voltage to a module suddenly dropping to zero, due to the main power switch failing short and the individual module's fuse subsequently blowing, is probably the most common fault condition in single-ended converter modules. A very simple decoupling circuit can be made which will decouple the current sharing signal of a module which has experienced this failure mode from that of other modules. However, no provision is made in such circuits for disconnecting the current sharing signal for failures during which the current sharing signal goes low and the input voltage remains good.

SUMMARY OF THE INVENTION

It is therefore an object of the present invention to provide a current sharing decoupling circuit as a means of interconnecting the current sharing signals of parallel modules, such circuit disconnecting, or decoupling the current sharing signal of any failed module, resulting in continued, uninterrupted operation of the load current, and providing for a substantially equal current contribution from each of the remaining modules, thereby increasing the system reliability, and providing a fault resistant system with what is known as n+1 redundancy.

Another object of the invention is to provide an improved means allowing replacement of faulty modules, wherein no substantial interruption of load current or system performance occurs during the replacing of the module, such means providing for the timely reconnection of the current sharing signal of a module being energized to the current sharing signal shared by the other operating modules in hot plug-in operations, such that the module being plugged in or joining is prevented from causing even momentary shut down of the system.

A still further object of the invention is to provide a means for sensing total system power, and from an algorithm, selecting the most efficient number of modules to supply the required load current, such means including power monitoring and logic circuitry in conjunction with the circuit of the preferred embodiment of the invention.

Still another object of the invention is to provide an output sensing network that does not consume large amounts of power, and that will allow automatic starting of all replacement modules.

Briefly, a preferred embodiment of the invention includes the provision of an individual current sharing signal coupling/decoupling circuit for each module of a number of parallel connected modules, each circuit providing an interface between a module's "current sharing signal" port and a common connection bus. The signal coupling/decoupling circuits also share a common ground noted in the disclosure as "current sharing signal ground". The signal coupling/decoupling circuit includes a comparator, a bi-directional switch and a variable voltage reference. The comparator senses the difference between the voltage on the common connection bus, the "common current sharing signal," less an amount set by the variable voltage reference circuit, and the voltage on the module current sharing signal port, the "module current sharing signal". If the module current sharing signal drops below the common current sharing signal, the comparator activates the bi-directional switch, disconnecting the module current sharing signal port from the common connection bus, allowing the remaining parallel connected modules to continue normal operation, thus providing a system that is tolerant of individual module faults. If n modules are the minimum number required to meet a system's current output specification, then the use of n+1, n+2, . . . n+N modules with corresponding current coupling/decoupling circuits will allow for continued operation of the system in the event of failure of 1, 2, . . . N modules, the system reliability increasing with the number of modules in excess of n.

Therefore, an advantage of the invention over prior art is its ability to automatically disconnect particular individual modules in the event of failure of the particular module's sharing signal.

The invention also has the advantage of providing for the replacement of a module, or the shut down of any individual module for test purposes, during system operation without interrupting the system performance. This can be accomplished by applying a logic signal to the "module current sharing signal" port, or by simply disconnecting the module, resulting in the comparator sensing the loss of the module current sharing signal relative to the common current sharing signal and providing an output to the bi-directional switch disconnecting the module electrically from the common current sharing signal line, thereby allowing the other modules to function normally.

A further advantage of the invention is realized in combination with a power monitor and logic circuit including a power sensing capability for detecting the total system power consumption, an algorithm defining the number of modules required for maximum efficiency at the sensed power, and a logic network for applying signals to the module current sharing signal ports to turn ON or OFF a required number of modules to achieve maximum efficiency and thereby conserve energy.

The invention also has the advantage of including an output sensing network that, working in combination with the control circuit, allows for automatic starting of modules. The network also consumes less power than prior art methods using resistors in series with the load.

The need for the network arises when a module, either as a hot plug replacement, or in other separate module startup operations, has an output voltage setting that is lower than that appearing at its sense terminals. In this case, starting will not normally take place without the network. This circuit has an advantage over the prior art in that it accomplishes the result with fewer parts and without using an amplifier to externally control the module output, and also without using isolation devices to connect both primary and secondary circuits.

These and other objects and advantages of the present invention will no doubt become apparent to those skilled in the art after reading the following detailed description of the preferred embodiments which are illustrated in the several figures of the drawing.

IN THE DRAWING

FIG. 3 is a plot of system signals during decoupling of a module;

FIG. 4 is a plot of system signals during coupling of a module back into the system;

DETAILED DESCRIPTION OF THE PREFERRED EMBODIMENTS

Figure 1:
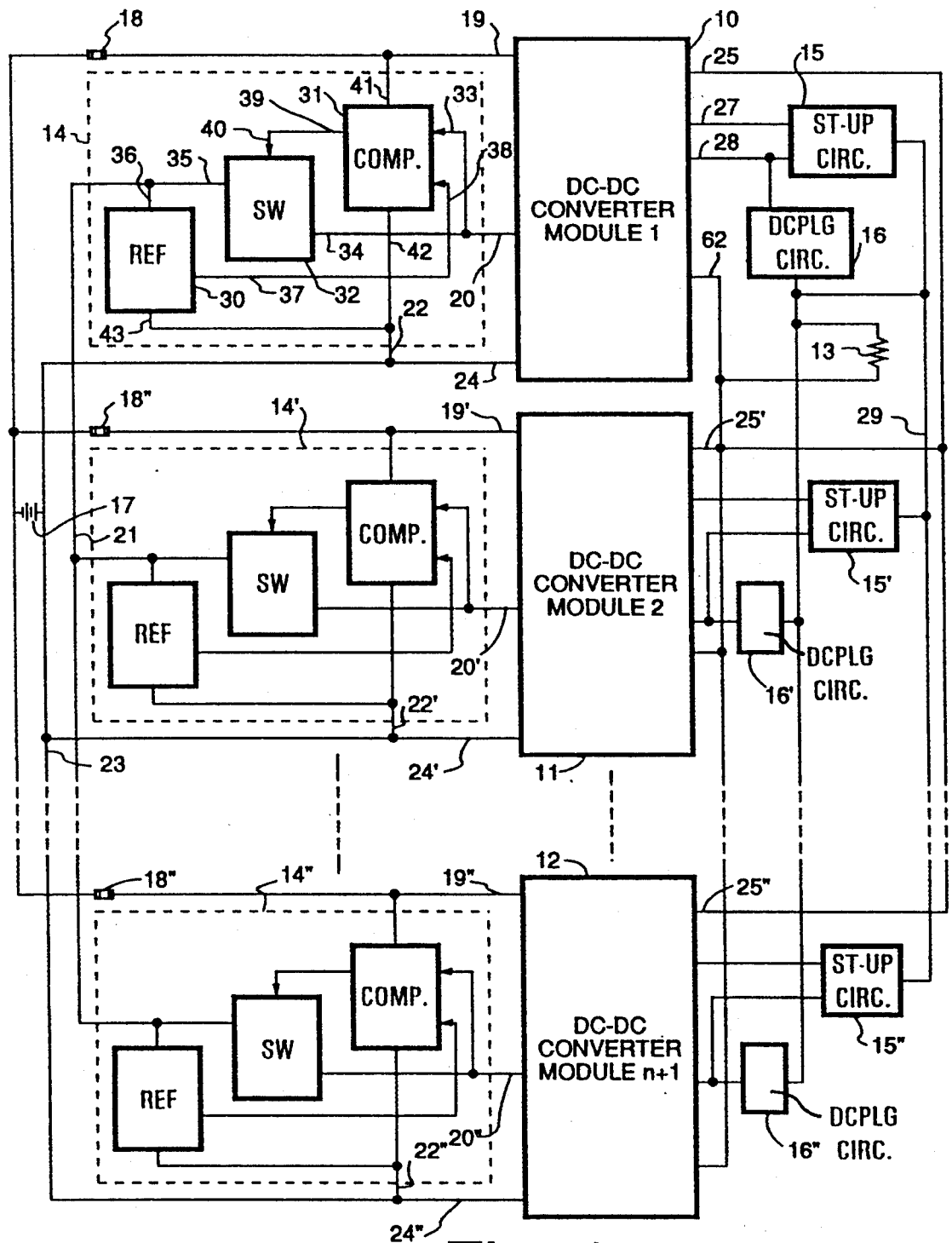
FIG. 1 is a block diagram showing a plurality of paralleled modules and associated coupling/decoupling networks in accordance with the present invention.

Referring now to FIG. 1 of the drawing, a first DC—DC converter module 10, a second module 11, and an n+1 module 12 are shown, with dashed lines interconnecting the second module with the n+1 module 12 to indicate any number of modules as being within the scope of the invention. The several modules are connected in parallel to provide current to a load 13. Each module is provided with interconnecting circuitry in accordance with the present invention which includes a current sharing signal coupling/decoupling circuit 14, a start up assist circuit 15 and a load decoupling circuit 16, the functions and details of each being discussed more fully in the following description.

An input voltage source 17 supplies power to the various modules and other circuitry, and each module and associated circuitry has a fuse 18 to individually protect each circuit in the event of a short at the corresponding supply terminal 19. The fuses allow provision of an uninterrupted supply of voltage to the non-failing modules and associated circuitry.

A module current sharing signal is produced internally by each module 10, 11, 12 for the purpose of controlling the module's current output. It is a signal that can be controlled or altered externally through the module current sharing signal port 20. If the module current sharing signal port 20 is shorted to ground, the module current output will go to zero. Thus, the port 20 can be used as a point to apply a logic low signal to disable the module. Under normal operation, all of the module ports 20 are electrically connected together through the current sharing signal decoupling circuits 14, thus forcing all of the module ports 20 to be at the same potential, in turn forcing all of the modules to deliver substantially equal currents to the load 13.

In the event of a drop in the current sharing signal level of an individual module, the function of the corresponding coupling/decoupling circuit 14 is to disconnect the faulty current sharing signal from the interconnecting bus 21, thereby allowing all other modules to continue uninterrupted operation, each module being forced by output sense circuitry within the modules 10, 11, 12 to readjust its current so as to maintain the total load current constant.

Each coupling/decoupling circuit 14 has a ground terminal 22, connected to a bus 23 which interconnects the negative inputs 24 of each module. On the output side of the converter modules, all of the negative sense ports 25 are connected in common by a bus 26. The start up assist circuit is connected between the + sense port 27, the + output port 28 and to the load 13 via a bus 29, and has the function of assuring startup of its associated module, this function and circuit will be explained in more detail below.

The load decoupling circuits 16 serve the purpose of isolating a module's + output terminal 28 from the load 13 and other modules in the event the + output signal drops in voltage. Each load decoupling circuit 16 normally includes a diode, allowing passage of current in only one direction.

The above described circuitry provides a highly fault resistant system, disconnecting faulty modules and providing means for allowing any individual module to be turned OFF for test or replacement purposes without interrupting the system operation. In the description of the operation of the invention that follows, only two modules are considered; however, the invention is intended to apply to any number of modules, as already explained. Also, the converter modules in the embodiments are of the DC-to-DC type, but it is an obvious extension of the present invention to provide for AC input, by merely adding an AC front end.

Since the modules are connected in parallel, the signal reference or ground connection is common to each module whether it is input or output referenced. By connecting the current mode PWM error voltages (current sharing signal appearing at terminal 20) of the modules to each other, the primary currents are forced to be equal to each other, and hence current sharing is achieved.

The current sourcing and sinking of the module's current sharing terminal are also relevant to the operation of the present invention, and in the case of the preferred embodiment are assumed to be similar to those produced by the UC3842A previously mentioned. The UC3842A error amplifier is capable of sinking more current than it can source.

Another important property of the current sharing signal is that it is first of all a signal produced by the module for comparison to and control of its own current output. It is also a signal that, if controlled or altered external to the internal PWM, can control the module's current output, since the current mode PWM will in any case use this signal to compare its current. A simple illustration of this point is that if this signal is shorted to ground, or is held at zero potential externally, the module output will go to zero, because the current mode PWM holds the current to zero in this case. Thus, as will be explained in more detail below, this terminal can usually be used as a point to apply a logic low signal to disable the converter.

In further description of the decoupling circuits 14, each such circuit is shown to include a variable reference 30, a comparator 31, and a bi-directional switch 32. The current sharing signal port 20 of the corresponding converter module is connected to the plus input 33 of the comparator 31, and to the terminal 34 of the bi-directional switch 32. The opposite side (terminal 35) of the bi-directional switch 32 is connected to the variable reference input 36 and to the common bus 21, which is in turn connected to the same point on each of the other decoupling circuits. The variable reference output at terminal 37 provides the minus input at terminal 38 of the comparator 31, and the comparator output at terminal 39 drives the control terminal 40 of the bi-directional switch 32.

Comparator 31 has a voltage supply input at terminal 41, and the comparator 31 and variable reference 30 have ground terminals 42 and 43 respectively, which are connected together and joined to the signal ground terminal 22 that is connected via bus 23 in common with the corresponding terminals of all the other coupling-/decoupling circuits 14. A function of each circuit 14 is to provide for automatic disconnection of the converter module current sharing signal port 20 to which it is connected in the event of a failure of the module. How this is accomplished will become clearer as the operation of the various circuit elements is discussed.

The primary function of the variable voltage reference 30 is to provide a reference voltage at terminal 37 which is just slightly lower in magnitude than the voltage appearing at its input 36, the signal at the input 36 being substantially equal in magnitude to the current sharing signal developed at port 20 by the converter module whenever the bi-directional switch 32 is turned ON. A second function of the variable reference 30 is to sustain the reference signal level at 37 for some time interval should the level of the signal at its input 36 drop.

The comparator 31 performs the function of comparing the reference signal provided at its input 38, with the current sharing signal developed at port 20 and appearing at the comparator's plus input 33. The operation of the comparator is such that when the difference in voltage between its plus input 33 and its minus input 38 is positive, a signal is produced at its output 39, which is connected to the bi-directional switch control terminal 40, and is of a value so as to cause the switch 32 to close, connecting the terminals 34 and 35. In the event that the current sharing signal should drop below the level of the reference signal at 37, causing the difference in voltage between the comparator plus terminal 32 and minus terminal 38 to become negative, comparator 31 will produce a voltage at its output 39, for input to the control terminal 40, and at a value sufficient to cause the bi-directional switch 32 to open, electrically disconnecting the terminal 34 from the terminal 35, and therefore effectively disconnecting the converter module 10 from current sharing signal bus 21, thereby allowing the other modules to continue normal operation, unaffected by the failure of the module's current sharing signal. Due to slight variations in the current sharing signals and output voltages produced by different modules, the bi-directional switch 32 is designed to conduct in whichever direction is required, depending upon whether its associated module is sourcing or sinking current from its corresponding current sharing signal terminal.

Figure 2:
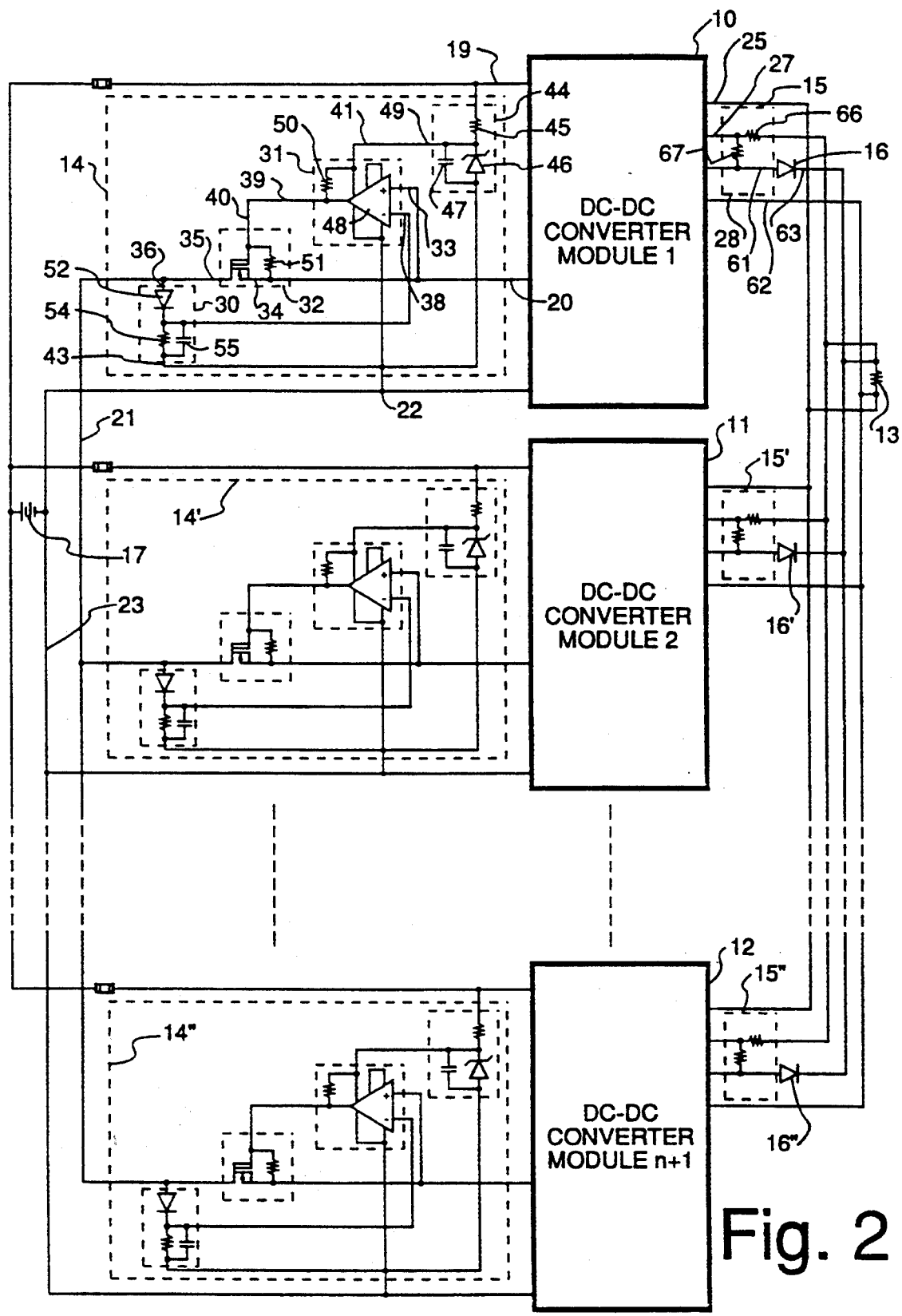
FIG. 2 is a diagram showing the paralleled modules and coupling/decoupling circuitry of FIG. 1 in more detail.

Referring now to FIG. 2 for a more detailed description of one of the current sharing signal coupling-/decoupling circuits, it will be noted that a voltage supply regulator 44 has been added. During normal operation, the regulator 44 merely supplies a voltage for the comparator 31 that is within its normal operating range. The regulator is made up of a voltage dropping resistor 45 a zener diode 46, and a capacitor 47. A 15 V zener diode is used in the preferred embodiment. Capacitor 47 is a 0.1 uF ceramic capacitor that is used to bypass high frequency noise. The resistance and wattage of resistor 45 is chosen to supply appropriate comparator current from the voltage source 17. This circuit also supplies voltage to turn on the bi-directional switch 32.

Comparator 31 is comprised of an integrated circuit device 48 of a type specified for operation from a single positive supply, such as an LM311. Pin 8 is the Vcc terminal and is connected to the voltage regulator supply output 49. Pin 7 provides the output 39. Since the comparator output is active low, a pull up resistor 50 is provided between the comparator output 39 and the comparator Vcc supply terminal 41 to cause the output 39 to be essentially at the level of the voltage regulator output 49 when the comparator output is not active. The control terminal. 40 of the bi-directional switch 32 will be connected to the voltage regulator output 49 through resistor 50 whenever the comparator output is not low. This occurs when the voltage difference between the comparator's plus input 33 and minus input 38 is within the input offset required, which is essentially zero, or positive. The comparator's differential input voltage is the voltage at pin 2 of integrated circuit 48 with respect to the voltage at integrated circuit pin 3. When the differential voltage is negative, the comparator's output becomes active low. In other words, its output drives the control terminal of the bi-directional switch 32 essentially to signal ground potential. Resistor 50 is chosen such that it provides sufficient current to the control terminal of the bi-directional switch 32 to turn ON the switch when the integrated circuit output is not low, and such that the current provided to the output of circuit 48, when its output is low, can be saturated. Pins 5 and 6 of circuit 48 are the balance inputs and are not used. Pin 1 is the ground pin, and pin 4 is the Vee pin. Both are connected to signal ground for single supply operation.

The bi-directional switch used in this embodiment is a small, n-channel enhancement mode MOSFET device, such as a 2N7000, with its source terminal 34 connected to the module's current sharing signal terminal 20, and its drain terminal 35 connected to the variable reference input 36 and to the common current sharing signal bus 21, i.e., to the corresponding terminals of the other current sharing signal coupling/decoupling circuits. These terminals are connected so that the parasitic body diode of the MOSFET is reverse biased when the current sharing signal connected to the source is low. The MOSFET gate 40 is connected to the comparator output 39.

The 2N7000 MOSFET has an ON resistance of about 5 ohms when the gate-to-source drive voltage is 10 V, which is low enough to essentially connect the module current sharing signals of the various modules to each other without producing a significant voltage drop. The current sharing signals 22 of all the modules are thus equal. About 1 mA of current flows through the bi-directional switch terminals during normal operation, thus a voltage drop of about 5 mV is produced. This voltage drop is of negligible value when compared to the value of the sharing signal level, and so does not upset the current sharing of the modules.

The MOSFET is capable of conducting in either direction, from source-to-drain, or from drain-to-source whenever the gate to source voltage is greater than a threshold value. The direction of current flow during normal operation may be in either direction. In the case of two modules connected in parallel, one of the MOSFETs conducts from source-to-drain, while the other conducts from drain-to-source, which is the reason for using a bi-directional switch. The actual direction of current flow is determined by differences in the output voltage settings of the modules and is discussed later.

The optimum value of drive voltage for the MOSFET is about 10 V. During normal operation, the voltage supply establishes a gate voltage of 15 V and the source voltage is equal to the current sharing signal voltage, which is in the 1 to 6 volt range. The gate-to-source voltage is then within the range of 9 to 14 volts, which provides near optimum drive conditions.

The resistor 51 is provided only as a precaution against static discharge during manufacturing and handling, as is common practice, and has no significant impact on the operation of the circuit.

The variable reference 30 is made up of a diode 52, resistor 54, and capacitor 55. Diode 52 is a small Schottky diode, and is connected in series with the parallel combination of resistor 54 and capacitor 55. The variable reference output 37 is taken from the connection of the cathode of diode 52 and one end of the parallel combination of resistor 54 and capacitor 55. The other end of the parallel combination of resistor 54 and capacitor 55 is connected to signal ground terminal 49.

The variable reference 30 produces a reference signal at its output 37 that is just slightly below that at the variable reference input 36, and can hold up its output for some time after its input drops suddenly. Resistor 54 and diode 52 are chosen so that only a small current flows through the Schottky diode 52, and thus the voltage drop across the Schottky is very low. The reason for choosing a Schottky diode is the same, so that its voltage drop is small. For example, a current of 10 uA flowing through a 1N5817 diode produces a voltage drop of about 100 mV. This drop is small compared to the value of the current sharing signal, which is typically greater than 2.5 V. The capacitance for capacitor 55 is chosen to provide the hold-up time required to hold the reference up when required during decoupling, as previously described. That is, when the voltage at the variable reference input 36 suddenly drops, diode 52 will become reverse biased, and capacitor 55 will be discharged at a rate determined by the values of capacitor 55 and resistor 54. To further clarify, the operation of the current sharing signal coupling/decoupling circuit can be obtained by plotting the signals as a function of time for a simple two module system composed of the Modules 1 and 2, i.e., blocks 10 and 11.

FIG. 3 is a timing diagram showing representative circuit voltage levels when the current sharing signal 20 of Module 1 suddenly drops to zero and its decoupling circuit functions. Shown in FIG. 3 are the module current sharing signals 56 and 57 of Module 1 and Module 2 respectively, the Module 1 reference signal 58, the comparator output 59, and the comparator differential input signal 60. Initially the modules are both operating normally, sharing the load 13. The modules should each be providing an amount of output power that is 50% of their full capability or less, so that when one module is shut down or fails, and is decoupled, then the other can provide the entire load, which will be within its capability. Initially then, the module current sharing signals 56 and 57 are equal, and are at a level that corresponds to a half loaded condition or less.

The module reference signal 58 is a slight amount less than the module current sharing signals 56 and 57, and so the comparator differential input signal 60 will be positive by this small amount, about 50mV. This differential input voltage is sufficient to keep the comparator output 39 from being active, and so its pull-up resistor 50 holds the output high, at the level of the comparator supply at terminal 41.

At time t1, the current sharing signal 56 of Module 1 suddenly begins to drop, either due to fault or on purpose, by application of a logic low signal, for example. In either case this point falls rapidly due to its becoming a low impedance path to signal ground. Since it is connected to Module 2's current sharing signal 57, signal 57 begins to drop as well, as does the variable reference input 36.

Since the reference has hold up time, it drops much more slowly. The comparator's differential input voltage 60 then starts to be reduced, roughly at the same rate of change as the current sharing signal 56 if the hold up is great enough.

The comparator output 59 remains high as long as its input remains positive. At time t2, the comparator input reaches zero and begins to change polarity. This causes the comparator to latch its output to zero, which opens the MOSFET switch 32.

At this point in time, the current sharing signal 56 of Module 1 is decoupled from that of Module 2, and continues to drop. The current sharing signal 57 of Module 2 on the other hand, no longer being dragged down by having to source current to the low impedance causing the fall of the module current sharing signal of Module 1, suddenly rises to a value which corresponds to a load twice as great as the initial value that it was supplying prior to t1, since it now must supply the entire load power.

The reference signal 58 continues to track the variable reference input signal whenever its input is not falling or already less than its output. After t2 then, it rises to the new level supplied by Module 2.

To this point, only the decoupling function of the circuit has been discussed in detail. In order to be useful as a circuit in hot plug-in applications, or in applications where it is desirable to turn individual modules ON and OFF using a logic signal, or by switching the input voltage to that module, then the circuit would have to be capable of recoupling the current sharing signal of the joining module to that of the module or modules already supplying power to the load, such that the power supplied to the load was not unacceptably interrupted or perturbed, and such that the joining module immediately starts to share the load with the module or modules already supplying power to the load. Thus, a faulty module could be replaced without ever losing power at the load, and the replacement module would immediately reduce the share of the load carried by the existing modules.

The following detailed discussion will clarify the operation of the various circuitry during start up, and will particularly describe the start up assist circuit 15.

Referring now to the connections on the output side of the modules in FIG. 2, the plus output terminal 27 of each converter module is connected to the anode 61 of an "OR" or "ORing" diode 16. The minus output terminal 62 of each module, and the cathode 63 of each ORing diode are shown connected in a manner to supply power to the load 13. If each ORing diode 64 is considered to be a part of its associated module, then the outputs can be described as being connected in parallel. The outputs are also sometimes said to be "ORed". Although not commonly, sometimes modules are provided with internal ORing diodes. The purpose of the ORing diodes is to prevent a short circuit appearing at the output of a module from appearing at the load. Thus, if the output of a module fails short and the other module continues to supply voltage to the load, the ORing diode of the failed module becomes reverse biased, and the load continues to function without a power interruption. The ORing diodes are chosen to have low forward voltage drop, since they must conduct the module's contribution to the load current, and to have enough reverse voltage capability to block the output voltage in the event of an output short. Usually a low voltage power Schottky diode is used. The use of ORing diodes is well known and common.

As previously mentioned, the modules are provided with remote sense terminals 25, 27. Also well known, the remote sense feature allows for voltage drops in series with the power supply output and load, such as the drop in the load leads and ORing diodes to be overcome by the supply, thus maintaining voltage regulation at the load. This is done by connecting the sense terminals to the load. In FIG. 2, the plus sense terminal 27 is connected to the load 13 through a resistor 66, which is of small value, and can be neglected during normal operation.

To describe the operation of the circuit during coupling or recoupling, the slight differences in the output voltage settings of the modules must be taken into account. Even though the difference between the output voltage settings of modules intended for parallel operation should be very small, they cannot be exactly equal, and even a difference of a millivolt can change the behavior of modules operating in parallel. Even if provided with a common trimming circuit, differences in the reference voltages internal to the module sense circuits will have the same effect as slightly different settings. In the normal operation of converters operating in parallel as shown in FIG. 2, each converter is operating in such a manner as to establish a slightly different voltage at the load 13, or more correctly, at its own sense terminals, due to the slight difference in the settings, one higher, one lower.

In the case of two modules with current sharing capability and with current sharing signals of the type previously described, the output voltage will be controlled by the module with the lower output voltage setting. This is due to the imbalanced sourcing and sinking capabilities of the current sharing terminals. The module with the higher output voltage setting has a voltage present at its sense terminals that is slightly lower than its setting. In order to raise the output voltage to the level of its setting, it would have to raise its current sharing signal slightly, in order to allow slightly more current flow, but to do this it would also have to raise the level of the current sharing signal of the other module, since they are connected together. The only way it has of doing this is to source current to the other module's current sharing terminal, in order to drive the level of the common current sharing signal up slightly. The other module is at the same time holding the current sharing signal down at a level appropriate to keep the output voltage at the value of its own setting and does this by sinking any current at its current sharing terminal that is sourced by the current sharing terminal of the module with the higher output voltage setting. Therefore, the module with the lower setting is sinking current at its current sharing terminal, and the one with the higher setting sources that current. As previously described, a module cannot source as much current from this point as it can sink, so the module with the lower output voltage setting holds the current sharing signal level down at a level that produces a voltage at its sense terminals that corresponds to its setting. To restate this, both modules operate on the common current sharing signal. The module with the higher setting sources as much current as it can in order to pull up that signal. The module with the lower setting can hold the signal down by sinking the current sourced by the higher module, since this current is well within its sinking capability.

The foregoing description of the normal operation is important for two reasons. First, it illustrates why the present invention must incorporate a switch capable of conducting in either direction without significant voltage drop. Second, it serves to illustrate why the recoupling of a module with a lower output voltage setting than that already present at its sense terminals presents a particular problem.

First, the coupling or recoupling of a module with an output voltage setting slightly higher than that present at the load will be described. Recoupling can take on several forms; either removal of the logic low signal at a modules' current sharing terminal 20, hot plug-in of a module, or switching on the input voltage to that module.

In any of these cases, the module will initially have a current sharing signal of zero. Therefore it is necessary for the bi-directional switch 32 to be open, and to remain open until the module current sharing signal of the joining module has risen to an appropriate value before it closes and couples the current sharing signals. From the operation of the circuit described previously, it can be seen that when the module current sharing signal is zero, the bi-directional switch 32 is open.

The voltage present at the load 13, and hence at the sense terminals 25, 27 of the module is slightly less than the setting of the joining module, therefore the module's current sharing signal (at port 20) will start to rise in an attempt to raise the output voltage 67. Usually the rate of rise of the signal is fairly slow due to slow starting circuitry within the module that prevents stress and overshoot at the output during start up. This is shown in the timing diagram of FIG. 4, where Module 1 is the module being coupled, and its current signal 68 is shown ramping up, beginning at time t1. The comparator 1 differential input signal 69, which is initially negative, also starts to ramp up at time t1.

The Module 2 current sharing signal 70 is initially at a level corresponding to its supplying the entire load power, and reference 1 output 71 and reference 2 output (not shown) are at a level just slightly below the level of the Module 2 current sharing signal 70; that signal is the input to both variable reference circuits.

Since the bi-directional switch corresponding to Module 1 is open, neither module's current sharing terminal is sourcing or sinking current to or from the other's current sharing terminal during the ramping up of the current sharing terminal of Module 1; Module 2 continues to supply the entire load current as the output of Module 1 is ramping up, and the ORing diode of Module 1 is reverse biased. Therefore Module 2's current sharing signal and the variable reference signals remain constant.

At time t2, the Module 1 currently sharing signal 68 reaches a level that is essentially equal to the reference signal 71, and the differential input 69 of the first comparator becomes positive, causing the output 72 of the comparator to go high, thus turning ON the bi-directional switch.

When the switch closes, the current sharing signals are actually at slightly different levels; that of Module 2 is slightly higher than that of Module 1, due to the margin of difference between the level produced by the reference and that actually required to make the comparator differential input essentially zero. Specifically, the comparator may require a differential input offset in the range of plus or minus 2 millivolts, whereas the reference can easily be made to produce a difference of 50 millivolts using the reference construction previously described.

The switching time of the comparator output and MOSFET switch is nearly instantaneous when compared to the ramping up time of the current sharing signal, so in the scale of the timing diagram, the two current sharing signals instantaneously jump to a level that is halfway between the two upon the closing of the bi-directional switch at time t2. This produces essentially identical voltages at each current sharing terminal, reference, and hence comparator input; both bi-directional switches are ON and the modules, or more properly, the current sharing signals are said to be coupled.

At this point, the voltage at the load remains unchanged due to the rising of the output of Module 1 lagging behind the ramping up of its current sharing signal, due to slewing. That is, although the current sharing signal ramps up at a certain speed, the actual current produced may not be as great as the corresponding steady state level due to other limits such as maximum pulse width limit, charging of output capacitors, etc.

The gradual contribution in output current made by Module 1 allows Module 2 to gradually reduce its contribution, and hence the current sharing signals of both modules, since they are coupled. Since this change takes place at a relatively slow rate compared to the sudden dropping of the current sharing signal when decoupling is required, the hold up of the reference is comparable to the rate of decrease of the current sharing signals during the coupling operation, so that the differential input to the comparators remains positive and the modules remain coupled. Specifically, the values of resistor 54 and capacitor 5 must be chosen such that resistor 54 discharges capacitor 55 at a rate comparable to the rate of change of the module current sharing signal during recoupling. This time is related to the load transient response of the module and is on the order of 100 μs, in general. The timing diagram of FIG. 4 shows a rate of change that is just fast enough to allow the comparator's differential input to remain positive until t3, when the current sharing signals reach their steady state values, corresponding to each taking half of the total load, and level off.

At t3, the comparator's differential input starts increasing, as the reference continues to decrease to its steady state value, which is reached at time t4.

Whether if due to the removal of a logic low signal at the module current sharing terminal, or by the closing of a switch connecting the positive input terminal of the module to the input source, the coupling of a module with an output voltage setting higher than the voltage present at its sense terminals will proceed as described above.

During hot plug-in, the various terminals of the module may make connection to the circuit at different times and cause different and unpredictable behavior. Thus, for hot plug-in applications, it is desirable to control the order in which the connections are made. The present invention is intended to have all connections made prior to the positive input connection so that the hot plug-in becomes equivalent to connecting the positive input terminal 19 of the module to the input voltage source 17 with a switch. In this way the circuit automatically makes the connection of the module's current sharing terminal at the appropriate time.

When a logic low signal is removed from the current sharing terminal, or a switch is closed, connecting the input voltage source to the positive input terminal of a module with an output voltage setting that is lower than that appearing at its sense terminals, coupling may not take place without providing the start up assist circuit 15 composed of resistors 66 and 67 shown in FIG. 2, depending on the design of the module.

An important part of the module design is where the supply voltage for the sense is obtained from. There are generally three cases: (1) directly from the output via connections internal to the module; (2) from the output via the sense connections; and (3) from a separate internal voltage supply for the sense circuitry. These cases can be reduced to two cases. Consider the operation of two modules connected as in FIG. 2, with a module of a slightly higher setting already supplying power to the load. In the case of the sense circuit obtaining its supply voltage from the output via the sense connections, the sense circuitry of the disabled module is already biased up and giving the current mode PWM information about the voltage at its terminals. In this case, the other module is providing this voltage. In the case of the sense supply voltage being obtained from the output directly, this would not be the case, as the output of the disabled module being disabled causes its sense circuitry to be disabled as well. The separate internal voltage supply case can operate either way, depending on whether or not its operation is disabled by the disabling of the main converter power circuit.

In the second case, where the sense circuitry is disabled, the invention may operate as previously described for the coupling of a unit with an output voltage setting higher than that present at its sense terminals. Even though the voltage present at the sense terminals is greater than the output voltage setting, the sense circuitry, being disabled by the absence of supply voltage, will not provide a corresponding signal to the current mode PWM, and thus the current mode PWM will behave as if the output were low, allowing its current, and hence its current sharing signal to ramp up and couple to that of the other module as described above.

In the other case, where the supply voltage is provided by the sense connections, and hence by the other module despite the disabling of the one, the sense circuitry will not allow the current sharing signal to ramp up, since the voltage already present at its sense terminals is already higher than its setting. Instead, it tries to reduce its current sharing signal, in order to reduce its current, and hence the voltage present at its sense terminals.

In hot plug-in applications, this problem may be overcome by controlling the order in which the various terminals make contact, specifically, by making the sense connections at an appropriate time after the current sharing signal has risen. The problem still would occur in the case of removing a logic low signal from the current sharing terminal, or closing a switch connecting the input voltage source to the positive input terminal of the module.

This problem does not occur during the starting up of all modules simultaneously, because the voltage at the load is initially zero in that case, and so all modules allow their current sharing signals to ramp up. The signals are all immediately coupled together due to the fast tracking of the variable reference circuit when the current sharing signal is rising, and they remain coupled.

There are several methods of using or constructing the present invention that solve the above problem; one provides a means of adjusting the output voltage of a module either permanently or temporarily so that the coupling of a module with lower voltage does not have to be performed. It is the aim of the present invention to provide a means of performing this operation without having to be aware of this knowledge, such that a module with a lower voltage setting than that already present at the load can be coupled automatically, as long as its output voltage is within a certain acceptable range.

The start up assist circuit 15 is shown generally in FIG. 1, and more specifically in FIG. 2. It is made up of two resistors, 66 and 67, added to the output circuitry of each module. This network is used to aid in the coupling or recoupling of a module that obtains its sense circuit voltage Vcc from the sense connections, and that has an output voltage setting that is within an acceptable range of the voltage already present at the load.

This network can be used regardless of whether the module to be coupled has a setting that is slightly higher or lower than that of the load or that of other modules, thus it can be incorporated in the connections of each module, and serves to augment the performance of the present invention by overcoming the aforementioned problem related to the coupling or recoupling of a module that obtains its sense circuit voltage Vcc from the sense connections, and that has an output voltage setting that is slightly lower than that present at the load. In fact, it can be used to prevent the coupling of a module that is unacceptably low, as will be described.

The resistors 66 and 67 are connected and selected as follows: First, a resistor 66 of small value is placed in series with the plus sense line, in other words, the plus sense terminal 27 is connected to one end of this resistor, and the other end of the resistor is connected to the load 13. Second, resistor 67, of larger value is connected between the plus output terminal 28 and the plus sense terminal 27.

The proper values are determined from knowledge of the following parameters: the amount of sense circuit supply current normally flowing into the plus sense terminal, the typical voltage drop in the ORing diode 63, the value of resistance connected between the plus output 28, and minus output 62 internal to the module (usually called the preload resistor), and the acceptable difference between the setting of a module with a lower output voltage setting and that typically present at the load.

Of the four parameters, the first three are determined by the components already present (if a preload resistor is not present, it can simply be added), and the last is chosen. This is a powerful feature of the invention, since it can be used to prevent a module that will produce an unacceptably low output from being coupled. After all, the module with the lower setting will determine the voltage at the load, once coupled.

The network is designed so that during normal operation, no voltage appears across resistor 66, the resistor in series with the plus sense lead. The current required by the sense circuit is instead supplied by the output of the module, via resistor 67, the ORing diode 63 forward voltage appearing entirely across the much larger resistor 67 connected between plus output 28 and plus sense 27, thus no error is introduced, and the value of the latter resistor is determined by simply dividing the ORing diode drop by the sense current required. The value of the resistor in series is then chosen such that when the module is disabled, a small current flows from the load through the two resistors and the module preload, producing a voltage drop in the resistor in series with the plus sense lead such that the voltage present at the sense terminals of the module is not equal to the voltage at the load, but is rather the minimum acceptable voltage. If the module's setting is greater than this value, then the coupling will proceed as described previously for the coupling of a unit with a higher setting than that present at its sense terminals. If, on the other hand, the module's setting is below this minimum acceptable value, then the module will not be coupled, as its setting will be less than that present at its sense terminals.

Figure 5:
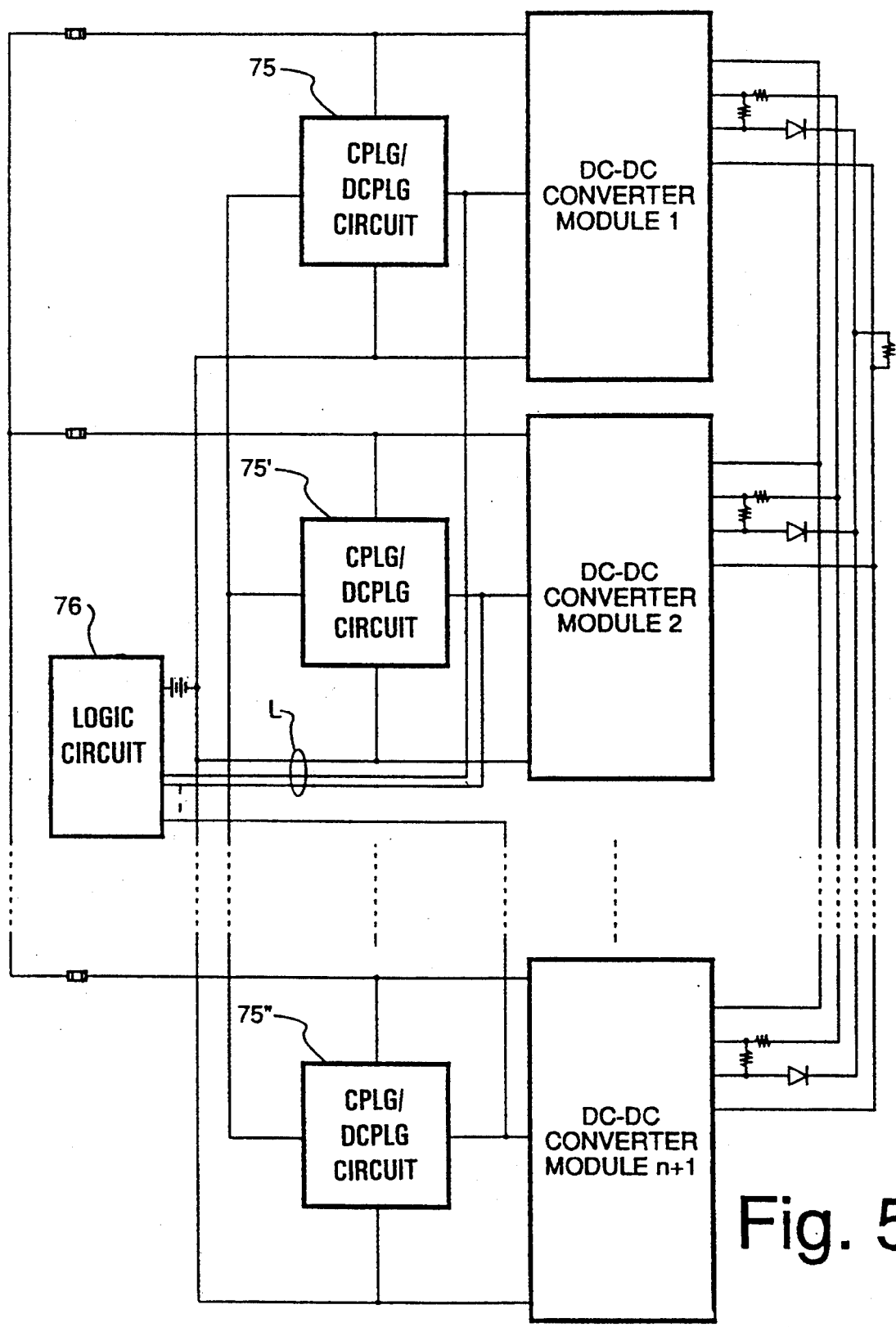
FIG. 5 is a block diagram generally illustrating an alternative embodiment of the present invention further including an energy conservation network.
Figure 5A:
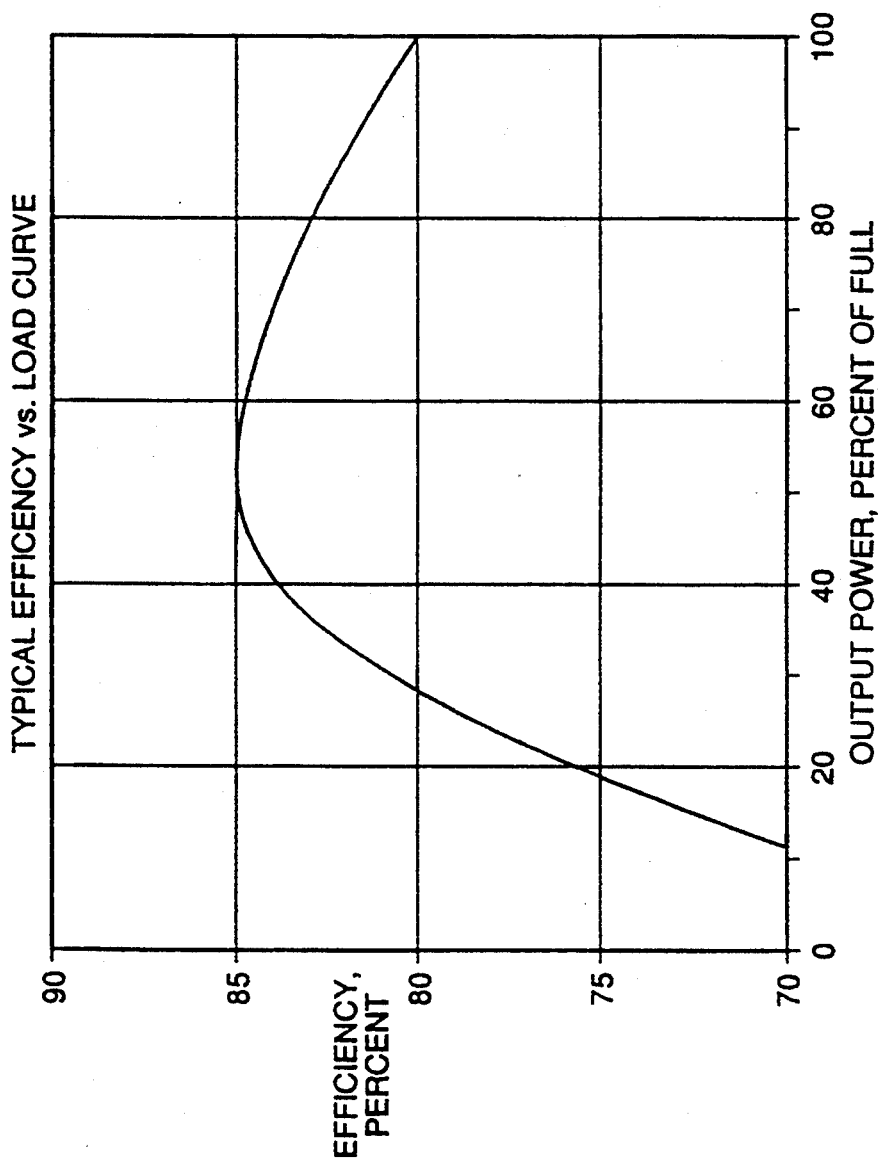
FIG. 5a is a diagram illustrating a typical efficiency vs. load curve for a power converter.

Referring now to FIG. 5 of the drawing, an embodiment of the present invention is shown including power monitoring and logic circuitry 76 to provide operation of the number of modules which produces minimum power loss and thus conserves energy. As illustrated in FIG. 5a, modular power supplies and power converters generally have an efficiency versus load curve with a maximum value at some load less than full rated load, often around half rated load. The number of modules used for a fully loaded system can be chosen such that each module is operating at the peak of its efficiency curve. If the load varies, power monitoring and logic circuitry 76 can provide logic signals to turn ON or OFF the number of modules required to keep the system operating at peak efficiency, and the circuit of the present invention provides the necessary coupling and decoupling of the current sharing signals.

Such a circuit is shown in block form in FIG. 5. Here each current sharing signal decoupling circuit is represented by a single four terminal block 75. Monitor and Logic Circuit 76 monitors the power delivered by the input voltage source 17 and uses an algorithm that translates input power to a number of modules for optimum efficiency and provides logic signals to enable that number of modules.

The same amount of power is provided to the load, whether all or only some of the modules are operating, but the number of modules operating determines the amount of load provided by each one. By turning modules ON and OFF by control signals developed on logic lines "L" the amount of load delivered by each is varied. Thus a number of modules are turned ON that results in all operating modules operating at the peak of their efficiency versus load curve.

As modules are turned ON and OFF, the coupling/decoupling circuits 75 perform the function of connecting and disconnecting the current sharing signals as previously described. Thus the invention works in conjunction with the power monitor and logic circuitry to minimize the amount of system power consumed.

Although in another embodiment of the present invention, a fixed reference, fixed at a value just below that of the steady state module current sharing signal magnitude could be used, the preferred circuit incorporates a variable reference in order to allow for changes in the magnitude of the module current sharing signal, which is a signal roughly proportional to the module primary current. Such changes may then occur if the load is varied, or if modules are decoupled or recoupled. That this reference be only slightly lower than the module current sharing signal is an important property, since the comparator plus input does not go below its minus input until it has dropped by this slight difference amount. Therefore, the bi-directional switch is not opened until the drop has occurred, and hence the module with the dropping current sharing signal is allowed to drag the current sharing signal of the other module down slightly. This will in turn cause a reduction in the primary current, and hence a small perturbation in the voltage supplied to the load. The advantage of having a variable reference that is at a level just slightly below that of the current sharing signal is clear, since the perturbation of the voltage supplied to the load can be kept within an acceptable margin.

If a fixed reference were used, it would have to be chosen to be slightly lower than the lowest expected current sharing signal, so that modules would still current share under those conditions. If the load, and hence the current sharing signal were to increase much, the reference would be left far enough below the current sharing signal that a significant drop in the output voltage would occur if a module was then decoupled.

Another alternate embodiment would be to have an adjustable reference that could be set, perhaps manually, just below the level of the current sharing signal, but this hardly compares to a variable reference that tracks the current sharing signal automatically, as does the preferred embodiment.

Figure 6:
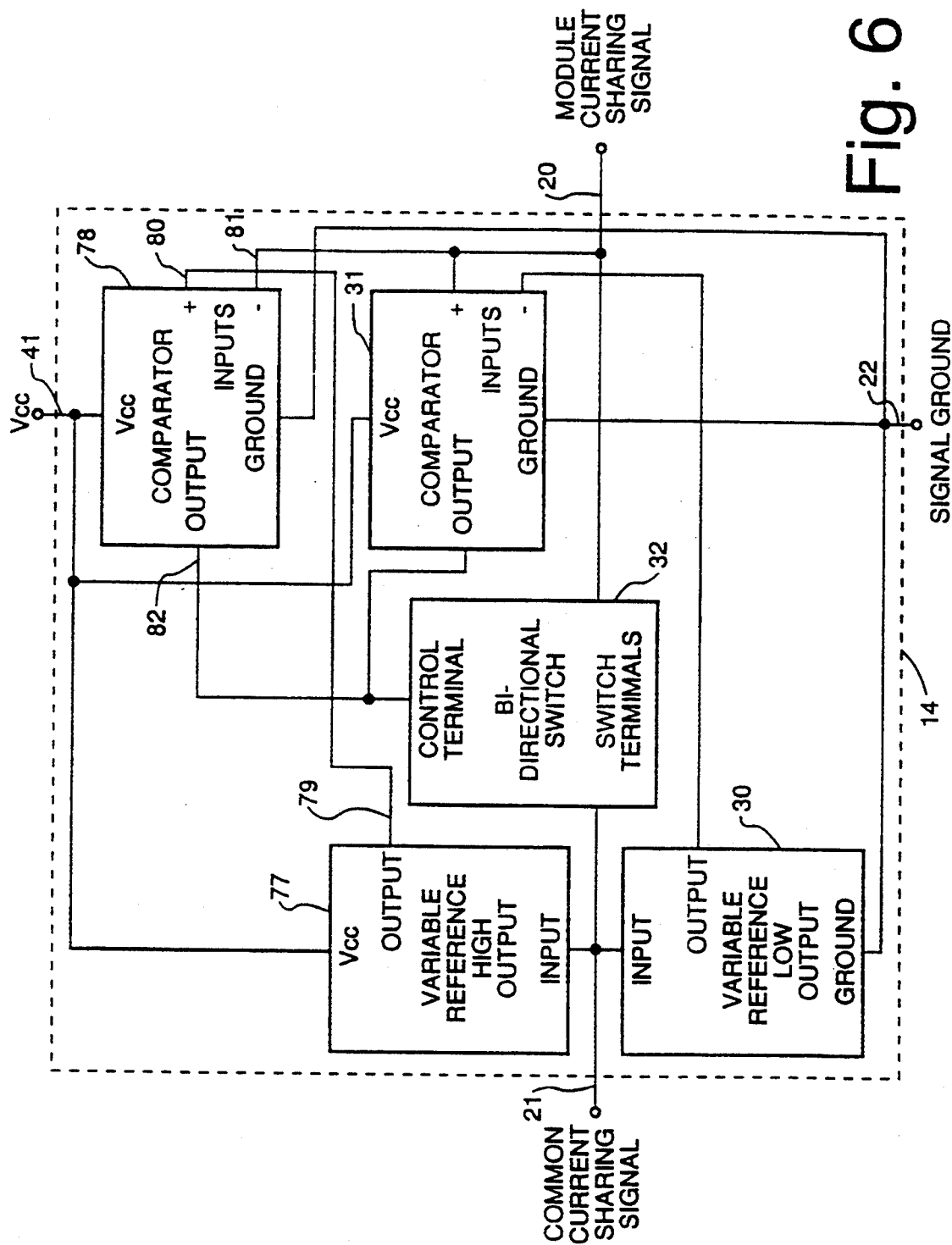
FIG. 6 is a block diagram showing a current sharing signal coupling/decoupling network with dual comparators and variable references.

Fault conditions which cause the current sharing signal of a module to go high should be considered as well. An alternate mode of construction for the decoupling circuits, following the description given above, would be to provide a second variable reference 77 and a second comparator 78 as shown in FIG. 6. In this embodiment, the second variable reference 77 also tracks the current sharing signal on line 21, but its output 79 is just slightly higher than the current sharing signal, and is connected to the plus input 80 of comparator 78, the minus input 81 of comparator 78 being connected to the current sharing signal on line 20 from the associated module. This block also functions to hold down its output for a short interval when the current sharing signal suddenly rises. The output 82 of the comparator 78 also drives the bi-directional switch 32, but is connected so that it drives the switch open in the event that the current sharing signal suddenly rises. Using two comparators that are active low, and that share a common pull-up resistor allows either comparator to open the bi-directional switch, regardless of the state of the other. In this embodiment, a narrow band around the current sharing signal is defined by the dual variable references. If the current sharing signal of a module suddenly goes outside of this band, its current sharing signal will be decoupled from the current sharing signal of the other module or modules. If there is significant likelihood of the current sharing signal of the module suddenly becoming a high voltage, high energy source, then this scheme would be considered worth the added complexity. The addition of a low voltage transient voltage suppressor, chosen to clamp the voltage at the current sharing terminal to a level that will not cause damage to the components of the decoupling circuit, and that will fail short, will cause a module to be decoupled even under these extreme fault conditions.

Since the likelihood of the current sharing signal of a module suddenly going high is much smaller than its going low due to fault, in most converter constructions, and since going low is in the direction required for turning a module OFF with a logic signal, then the two reference, two comparator approach may be deemed unnecessarily complex. The preferred embodiment instead takes advantage of the imbalance in the current sourcing and sinking capabilities of the module's current sharing signal to provide fault tolerance in most cases where the current sharing signal goes high, while still maintaining a fair degree of simplicity. Specifically, the current sharing signal, which is usually the error voltage of a current mode PWM, can be made to have a greater current sinking capability than its current sourcing capability.

This property may be inherent to the current mode PWM, as is the case with the UC3842A mentioned previously. If it is not, another embodiment would be to add this feature, for example by simply loading down the error voltage, so that only an amount of current which is within the sinking capability of another module is available to flow through the bi-directional switch, the rest having been shunted by the added load.

When the current sharing signal provided by each module has the sourcing and sinking properties just described, then the additional reference and comparator would not even function during some fault conditions where the current sharing signal of a faulty module attempts to go high, since the faulty module is not capable of sourcing enough current to the other module or modules to which it is coupled. The other module or modules will instead sink the required current to maintain current sharing and regulation of the power supplied to the load. In some cases, a faulty module can even be controlled by the remaining module or modules and will continue to share the load with the good module or modules.

An alternative method of construction of the variable reference would be a resistance divider with a capacitor in parallel with the lower divider resistors; this is to say that the diode 52 of FIG. 2 could be replaced by a resistor, but the diode and resistor combination has the advantage that the output of the variable reference can rise very quickly since the capacitor charges through the Schottky diode, and the hold up time can be determined by the time constant of the single resistor and capacitor. When the capacitor voltage is rising, the reference tracks the current sharing signal at its input with a difference in level that is relatively constant, due to the diode characteristic. When the signal at the input to the reference drops, the diode becomes reverse biased and blocks the flow of current from the reference back to the input and thus aids in the holding up of the reference output.

Figure 6A:
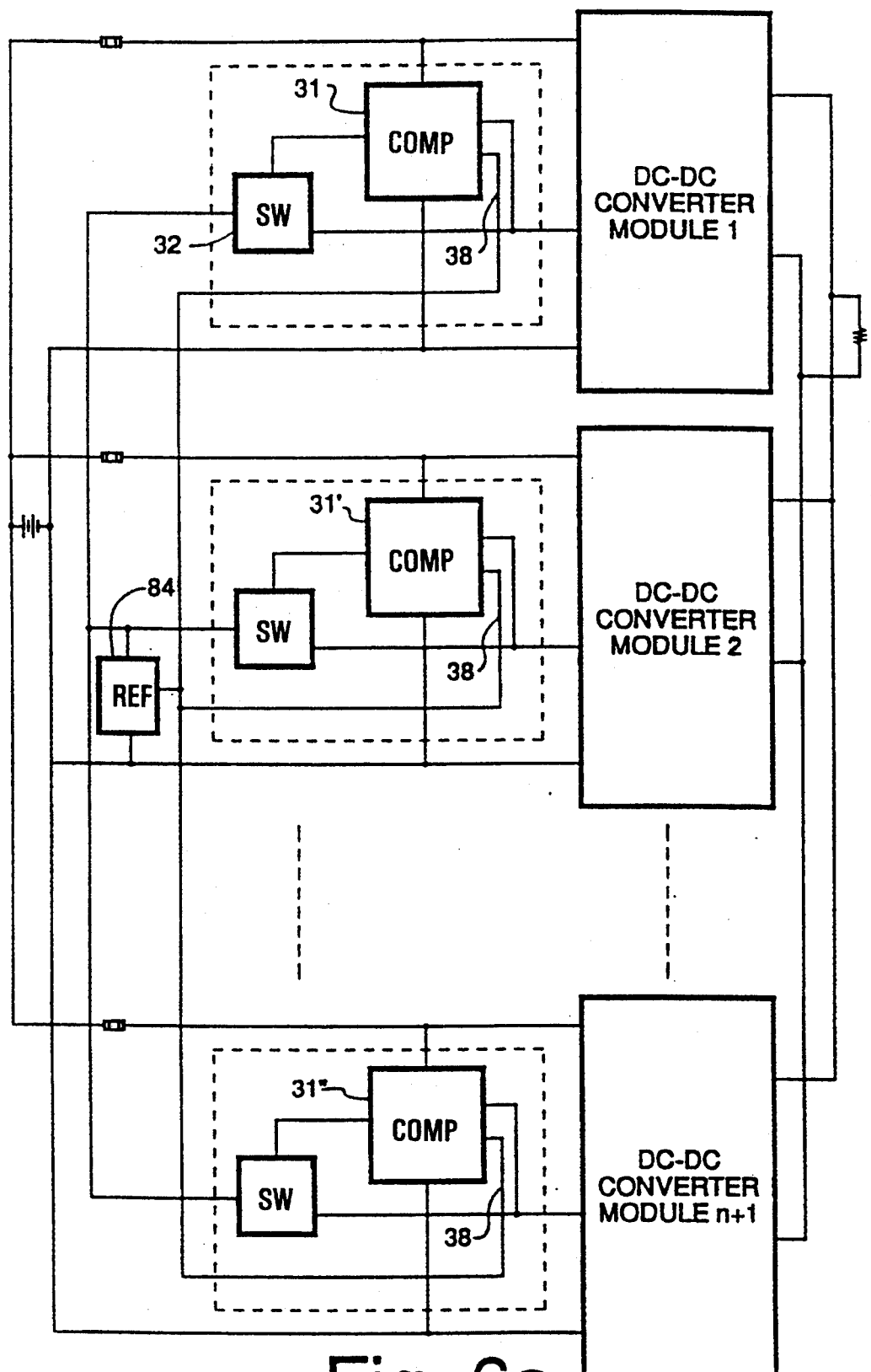
FIG. 6a is a block diagram illustrating another alternative embodiment of the present invention.

It should be noted that since the two reference circuits in FIG. 6 have a common input, and are identical, that their outputs are the same as well, neglecting the loading effect of the comparator input current, which is negligible. Thus an alternative method of construction would be as illustrated in FIG. 6a, to use a single reference 84 to supply the minus input 38 to each comparator 31. Because the components that make up the reference are very small and inexpensive, and because the present invention is intended to provide a high degree of reliability in modular, redundant power supply applications, the preferred embodiment illustrated in FIGS. 1 and 2 uses a reference for each decoupling circuit. This has the added advantage that the circuit can be constructed as a single, four terminal component, with terminals for plus input, module current sharing signal, common current sharing signal, and signal ground.

Figure 7:
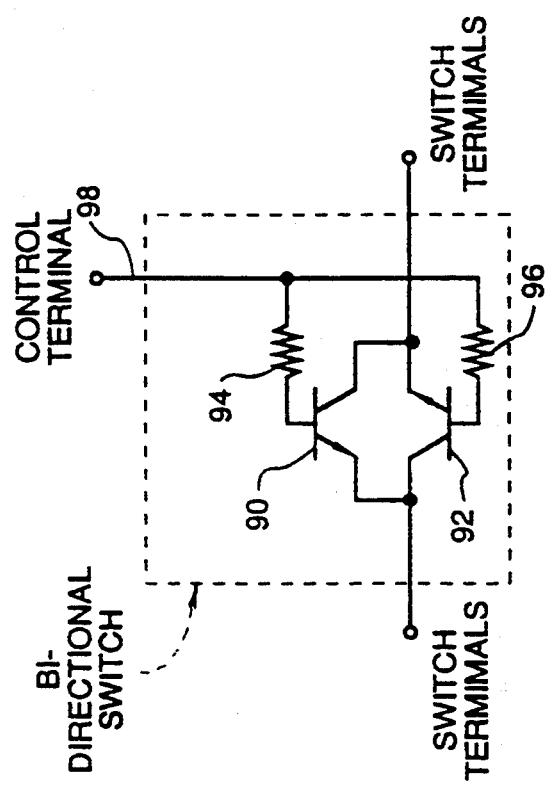
FIG. 7 is a schematic diagram showing an alternative bi-directional switch.

Another method of constructing the bi-directional switch is shown in FIG. 7. In this embodiment, the bi-directional switch is constructed using two suitably rated NPN transistors 90, 92 connected in antiparallel fashion. Bias resistors 94, 96 are provided for each transistor, and are connected between the control terminal 98 and the respective transistor bases. Thus, the transistors will be turned ON whenever the comparator output is high, and the antiparallel combination provides for the ability of current to flow in either direction through the switch. The resistors and transistors are chosen such that an amount of base current is provided to the transistors that is sufficient to produce a suitably low saturation voltage, so that the current sharing signals of the modules are essentially equal, but that is sufficiently small that the current sinking capability of the module's current sharing terminal is not exceeded. The MOSFET switch used in the preferred embodiment has the advantages of faster switching speed, and greater simplicity.

Although the present invention has been described above in terms of a specific embodiment, it is anticipated that alterations and modifications thereof will no doubt become apparent to those skilled in the art. It is therefore intended that the following claims be interpreted as covering all such alterations and modifications as fall within the true spirit and scope of the invention.

I claim:

1. A circuit for coupling/decoupling the current sharing signal terminal of a power converter module to an interconnecting bus in a power supply system including a plurality of current mode controlled power converter modules normally having their current sharing signal terminals connected to the interconnecting bus, the output terminals of said modules being connected in parallel to energize a common load, the circuit comprising:

reference means for developing a reference voltage;
comparator means for comparing the voltage developed at the current sharing signal terminal of a corresponding power converter module to said reference voltage and operative to generate a control signal having a first signal state when a first predetermined difference indicative of normal operation of the module is detected between the compared voltages, and having a second signal state when a second predetermined difference indicative of a malfunctioning module is detected between the compared voltages; and
switching means responsive to said control signal and operative to connect said current sharing signal terminal to said interconnecting bus when said control signal is of said first signal state, and to disconnect said current sharing signal terminal from said interconnecting bus when said control signal is of said second signal state, whereby in the event said corresponding power converter module malfunctions, it will be effectively disconnected from the system.

2. A circuit as recited in claim 1 wherein said reference means is coupled to said interconnecting bus and is operative to cause said reference voltage to have a predetermined relationship to the voltage appearing on said interconnecting bus.

3. A circuit as recited in claim 1 wherein said reference means develops a first reference voltage and a second reference voltage, said second reference voltage being different than said first reference voltage, and wherein said comparator means compares the voltage developed at the current sharing signal terminal of the corresponding power converter module to both said first reference voltage and said second reference voltage, and generates said control signal of said first signal state when the voltage developed at the current sharing signal terminal lies between said first reference voltage and said second reference voltage, and generates said control signal of said second signal state when said voltage developed at the current sharing signal terminal lies outside the range between the first reference voltage and the second reference voltage.

4. A circuit as recited in claim 1 wherein said switching means is a bi-directional electronic device allowing current to flow in either direction therethrough.

5. A power supply system comprising:

a plurality of current mode controlled power converter modules each having a current sharing signal terminal and a power output terminal, the power output terminals being connected together and adapted to power a common load;
an interconnecting bus; and
a plurality of current sharing signal coupling/decoupling circuits each of which is associated with one of said modules, each said circuit including
reference means for developing a reference voltage;
comparator means for comparing the voltage developed at the current sharing signal terminal of the associated power converter module to said reference voltage and operative to generate a control signal having a first signal state when a first predetermined difference indicative of normal operation of the associated module is detected between the compared voltages, and having a second signal state when a second predetermined difference indicative of a malfunctioning module is detected between the compared voltages; and
switching means responsive to said control signal and operative to connect said current sharing signal terminal to said interconnecting bus when said control signal is of said first signal state, and to disconnect said current sharing signal terminal from said interconnecting bus when said control signal is of said second signal state, whereby in the event the associated power converter module malfunctions, it will be effectively disconnected from the system.

6. A power supply system as recited in claim 5 and further comprising power monitoring, system control means for monitoring the power supplied by said power supply system and operative to cause selected ones of said control circuits to disconnect its associated power converter module from said system as required to maintain operation of said power supply system at a predetermined efficiency.

7. A power supply system as recited in claim 6 wherein said power monitoring, system control includes logic circuitry connected to the current sharing signal terminal of each said module, and is operative to cause a selected module to be effectively disconnected from the system by changing the voltage level at the selected terminal to a value sufficient to cause the associated comparator means to generate a control signal of said second signal state.

8. A power supply system as recited in claim 5 wherein said reference means is coupled to said interconnecting bus and is operative to cause said reference voltage to have a predetermined relationship to the voltage appearing on said interconnecting bus.

9. A power supply system as recited in claim 5 wherein said reference means develops a first reference voltage and a second reference voltage, said second reference voltage being different than said first reference voltage, and wherein said comparator means compares the voltage developed at the current sharing signal terminal of the associated power converter module to both said first reference voltage and said second reference voltage, and generates said control signal of said first signal state when the voltage developed at the current sharing signal terminal lies between said first reference voltage and said second reference voltage, and generates said control signal of said second signal state when said voltage developed at the current sharing signal terminal lies outside the range between the first reference voltage and the second reference voltage.

10. A power supply system as recited in claim 5 wherein each said module further includes an output sense port, and wherein said system further comprises:
a plurality of start-up assist circuits each of which is connected between the sense port and output terminal of an associated module and the load, said start-up circuits being operative to assure start-up of the associated module each time it is connected into the system.

11. A power supply system as recited in claim 10 wherein each said start-up circuit includes a first resistance means connected between an associated sense port and the load, and a second resistance means connected between said associated sense port and an associated output port.

12. A power supply system as recited in claim 10 wherein said system further comprises:
a plurality of load decoupling means each of which is associated with one of said modules and is connected between the associated output terminal and the load.

13. A power supply system as recited in claim 12 wherein said load decoupling means includes an ORing diode.

14. A power supply system as recited in claim 12 and further comprising power monitoring, system control means for monitoring the power supplied by said power supply system and operative to cause selected ones of said control circuits to disconnect its associated power converter module from said system as required to maintain operation of said power supply system at a predetermined efficiency.

15. A power supply system as recited in claim 14 wherein said reference means is coupled to said interconnecting bus and is operative to cause said reference voltage to have a predetermined relationship to the voltage appearing on said interconnecting bus.

16. A power supply system as recited in claim 14 wherein said reference means develops a first reference voltage and a second reference voltage, said second reference voltage being different than said first reference voltage, and wherein said comparator means compares the voltage developed at the current sharing signal terminal of the associated power converter module to both said first reference voltage and said second reference voltage, and generates said control signal of said first signal state when the voltage developed at the current sharing signal terminal lies between said first reference voltage and said second reference voltage, and generates said control signal of said second signal state when said voltage developed at the current sharing signal terminal lies outside the range between the first reference voltage and the second reference voltage.

17. A circuit as recited in claim 2 wherein said switching means is a bi-directional electronic device allowing current to flow in either direction therethrough.

18. A circuit as recited in claim 3 wherein said switching means is a bi-directional electronic device allowing current to flow in either direction therethrough.

* * * * *